July 3, 1928.
B. F. FITCH
1,675,701
FREIGHT TRUCK
Filed Oct. 13, 1925
4 Sheets-Sheet 1
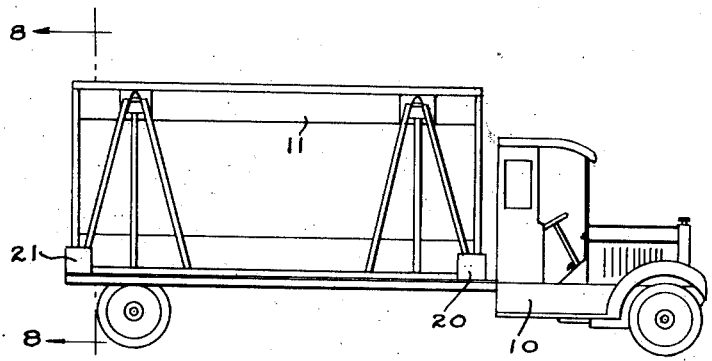
FIG.—1
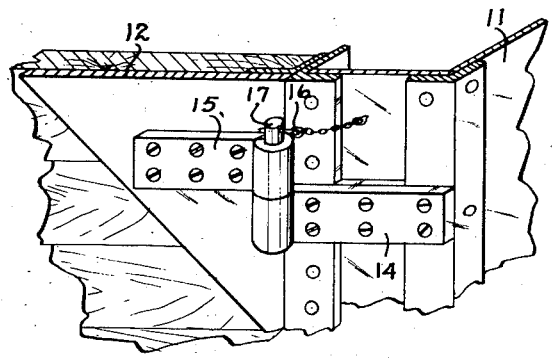
FIG.—4
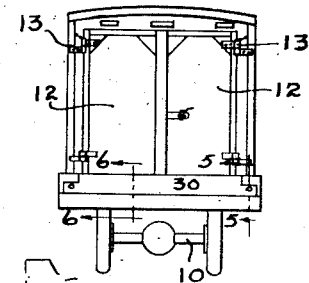
FIG.—2
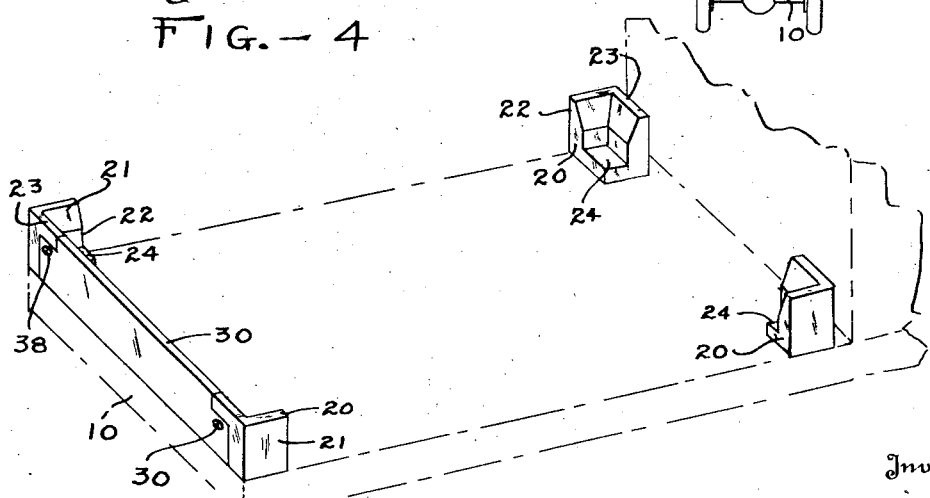
FIG.—3
Inventor
Benjamin F. Fitch
By Bates, Macklin, Volnich & Fran
Attorneys July 3, 1928.
B. F. FITCH
1,675,701
FREIGHT TRUCK
Filed Oct. 13, 1925
4 Sheets-Sheet 2
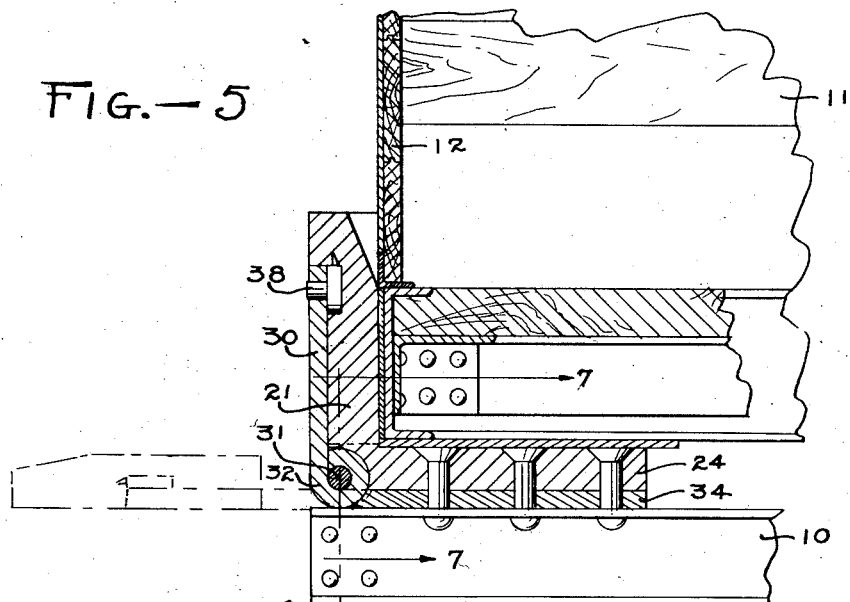
FIG.—5
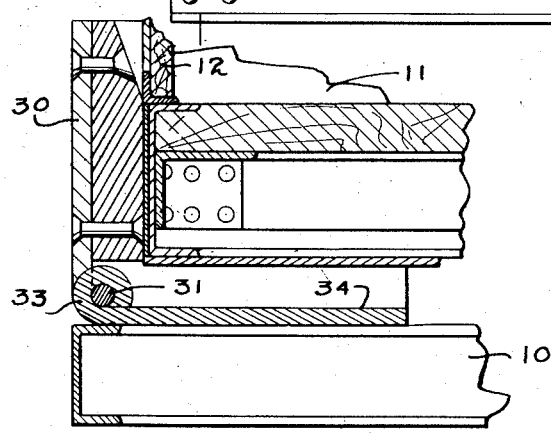
FIG.—6
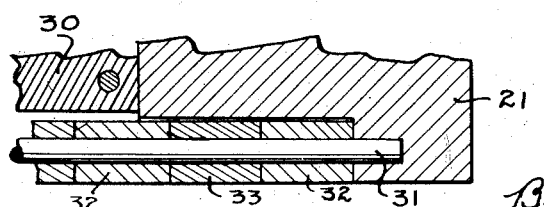
FIG.—7
Inventor
Benjamin F. Fitch,
By Baker, Mackler, Gabrick Stearns
Attorneys July 3, 1928.
B. F. FITCH
1,675,701
FREIGHT TRUCK
Filed Oct. 13, 1925
4 Sheets-Sheet 3
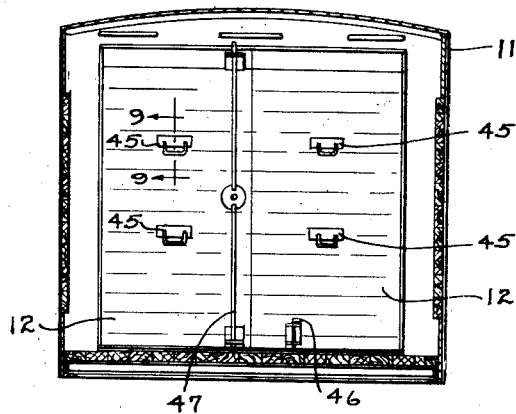
FIG.- 8
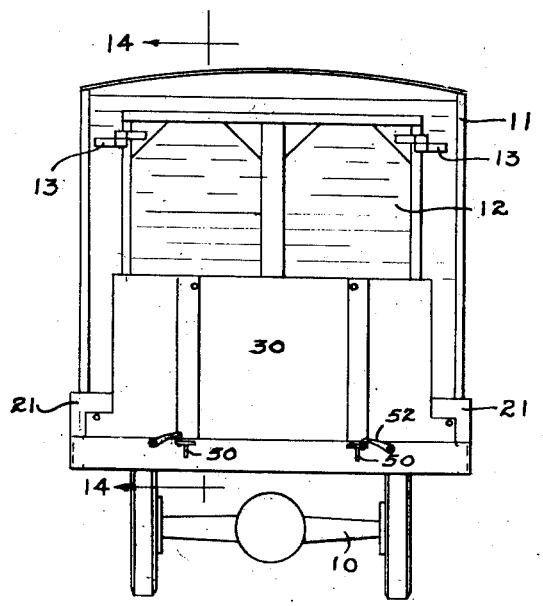
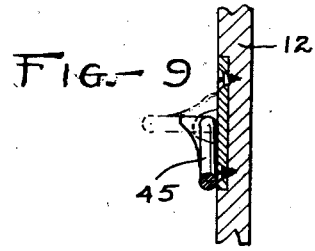
FIG.- 9
FIG.- 10
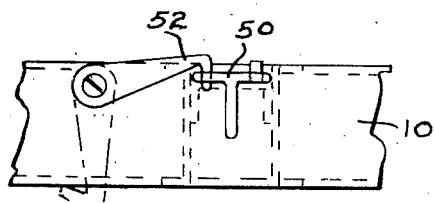
FIG.- 11
Inventor
Benjamin F. Fitch,
By Baker, Macklin, Golrick, & Fear
Attorneys July 3, 1928.
B. F. FITCH
1,675,701
FREIGHT TRUCK
Filed Oct. 13, 1925
4 Sheets-Sheet 4
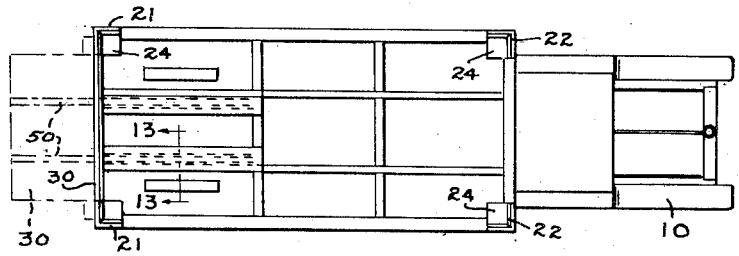
FIG.—12
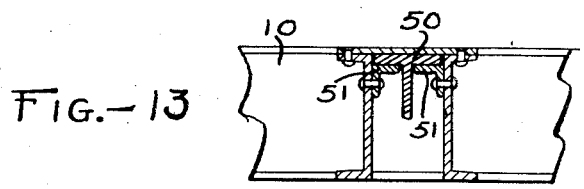
FIG.—13
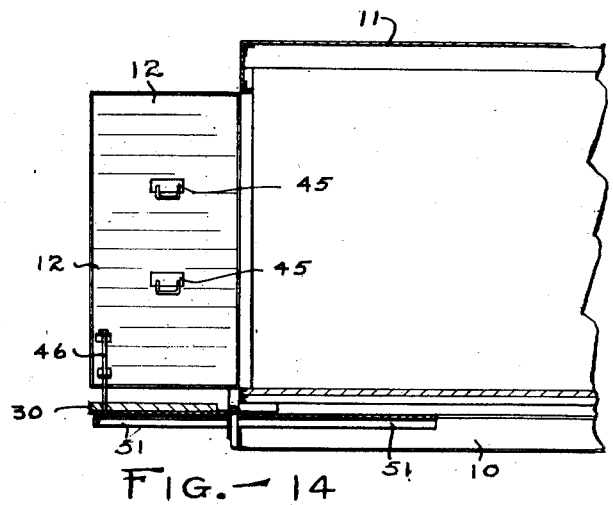
FIG.—14
Inventor
Benjamin F. Fitch.
By Bakis, Macklin, Golrick & Fear
Attorney Patented July 3, 1928.

1,675,701

UNITED STATES PATENT OFFICE.

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE.

FREIGHT TRUCK.

Application filed October 13, 1925. Serial No. 62,250.

In the handling of freight by removable containers on automobile trucks, it is frequently desirable that some upstanding portion of the truck frame lying adjacent to the body door extend above the lower edge of the door, so that the door cannot be opened without raising the container. On the other hand, if such bodies are placed on motor vehicles and used for route pick-up or delivery service, it is desirable that means be provided whereby the doors may be opened while the container is on the truck. It is one of the objects of the present invention to provide an automobile body with means which may be locked rigid in use and effectively prevent the opening of the door, but which may be unlocked to allow the door to open.

When such containers are placed on station platforms for loading and unloading, it is important that sufficient space be allowed alongside of the container for hand trucking. If container doors are hinged they are liable to extend into the trucking space and materially restrict the width of the trucking aisles. To prevent such restriction, I provide the hinges in such form that the doors may be lifted off of the containers altogether and may thus be stood in unimportant space,—for instance, between adjacent containers—during such loading and unloading. Such provision for removing the doors is however, only effective when the doors are open so that when the doors are on the truck they cannot be removed unless the retaining member above referred to is unlocked.

To provide for extra long loads, it is desirable that a tail gate be provided which may be held in a horizontal position and cooperate with a pair of hinged rear doors to effectively lengthen the container. When such tail gate is employed, I embody it with the locking means referred to, so that when the gate is in vertical position it effectively prevents access to the container until the device is unlocked. This is another feature of my invention.

A preferred apparatus for carrying out my invention is illustrated in the drawings, wherein Fig. 1 is a side elevation of a truck having a removable body thereon; Fig. 2 is a rear elevation of the truck shown in Fig. 1; Fig. 3 is a perspective diagrammatic view of a truck with the body removed therefrom and showing a locking bolster which operates in accordance with my invention; Fig. 4 is a perspective view, on an enlarged scale, showing a portion of the body adjacent the hinge section between the door and frame; Figs. 5 and 6 are sections taken on planes indicated by the correspondingly numbered lines in Fig. 2; Fig. 7 is a vertical section taken on a plane indicated by the line 7—7 in Fig. 5; Fig. 8 is a vertical transverse section taken on a plane indicated by the line 8—8 in Fig. 1; Fig. 9 is a detail of a door handle, being a section taken on a plane indicated by the line 9—9 in Fig. 8; Fig. 10 is a rear elevation of a truck having the locking device consolidated with a tail gate; Fig. 11 is a detail view on an enlarged scale showing tail gate supporting means; Fig. 12 is a plan view of a truck with the body removed therefrom; Fig. 13 is a section taken on a plane indicated by the line 13—13 in Fig. 12; and Fig. 14 is a section taken on a plane indicated by the line 14—14 in Fig. 10.

To position the container on the truck while allowing it to be readily placed or removed, I provide four corner brackets, two of which 20—20 are located just behind the cab of the truck, and the other two of which 21—21 are adjacent the rear end. Each of these brackets has a side wall 22 and an end wall 23, and a bottom or floor portion 24 which forms a supporting seat for the body. As shown, the side walls and end walls of the brackets are inwardly beveled from their upward edges to enable the body to be readily centered as it is put into position.

If there are doors at the forward end of the container, they are prevented from being opened when the container is on the truck by the adjacent cab of the truck. To prevent the rear doors being opened, I provide the member 30 which may be rigidly locked to the rear brackets 21 and then extends upwardly above the lower edge of the doors 12 as shown in Fig. 2. To permit access to the interior of the container while it rests on the truck, the rear member 30 is hinged by a horizontal rod 31 extending into the end brackets 21. The hinge eyes 32 are preferably turned inwardly toward the brackets and thus concealed. The cooperating eyes 33 may be formed on the rear end of a plate 34 extending beneath and riveted to the bracket, as shown in Fig. 5. This arrangement prevents tampering with the hinge in an effort to remove the end member. The cross member 30 is provided with a pair of locks 38 which are adapted to lock the member rigidly to the end brackets 21. As shown in Fig. 3, the cross member when in vertical position seats within the recesses in these end brackets so as to have its surfaces substantially flush with the inner and outer walls of the brackets. The locks are contained within the cross member and their bolts engage suitable keeping notches in the brackets.

By the construction described, the end member 30 may be effectively locked to end brackets 21 and act therewith as a rigid unit in case the body is to be unopened while on the truck. If the body is to be opened then the person in charge is provided with a key by which the locks 38 may be unlocked and the cross member turned down to free the doors.

Fig. 8 shows a section through the container and also shows the inner side of the doors in closed position. Each door has handles 45 for enabling it to be lifted from the hinges whenever desired. Moreover, locking bolts 46 and 47 on the inner side of the doors function to hold them closed before the gate is raised to the locking position.

To increase the freight carrying capacity of a container I may increase the size of the gate 30 shown in Fig. 10. In this figure, the width of the gate is substantially the width of a door so that the doors may be opened when the tail gate is lowered and may be held in such open position as shown in Fig. 14. The gate may be supported in such lowered position by any suitable means. A preferred mechanism however comprises a pair of rails 50 which are slidably mounted on guides 51. The guides are carried by the chassis frame and extend inwardly sufficiently far to keep the rails from projecting beyond the end of the frame when not in use. A pivoted hook-shaped member 52 may engage each rail to prevent it from sliding out of position. In Fig. 14, the rails are shown as extending outwardly from the frame and providing a supporting means for the gate.

In view of the foregoing description, it will be evident that I have provided a means for effectively locking the doors of removable automobile bodies while the bodies are in transit, and that I have provided doors which when desired may be easily and quickly removed to make the interior of the container accessible. An important advantage arising from my invention is the fact that, whenever the bodies are arranged in a row upon a platform, the doors do not confiscate valuable platform area, yet when the body is in transit, the doors may be maintained securely locked against surreptitious opening.

Having thus described my invention, I claim:—

1. In combination, a truck frame, means thereon for positioning a container, a container having a door in one wall thereof, and means pivotally mounted on, and extending upwardly from the frame and projecting across the door, and adapted to be locked for preventing opening of said door while the container is on the frame, said means being operable to permit opening of the door while the container is on the frame.

2. In combination, a frame, a removable automobile body adapted to rest upon the frame, spaced members on the frame adjacent the corners of said body, said body having a door in one wall thereof, and a gate connecting said members and across said door, said gate being operable to permit opening of the door.

3. In combination, a truck frame, a container having a door in one wall thereof, corner brackets on the frame adapted to position such container, and means extending across the door and adapted to be locked to a corner bracket for preventing opening of said door while the container is on the frame.

4. In combination, an automobile frame a removable automobile body adapted to rest upon the frame, corner brackets on the frame having beveled side and end walls for positioning the body and a cross bar hinged to the frame and adapted to be locked within recesses in the rear corner brackets.

5. In combination, an automobile frame, corner brackets carried thereby, a removable body adapted to be positioned thereby, said body having a doorway in one wall thereof, a door providing a closure for said doorway, said door being removably hinged to said body, a cross member hinged at its lower edge to the frame and adapted when disposed in upright position to prevent opening of the door, and means for locking the cross member when in such upright position to the adjacent corner brackets.

6. In combination, an automobile frame, a movable body adapted to rest thereon, said body having a doorway in one end wall thereof, a pair of doors providing a closure for said doorway, and said doors being hinged to said body, a tail gate hinged to the frame and adapted when disposed in upright position to prevent opening of the doors, means for locking the tail gate in such upright position, and means for securing the doors to the tail gate when in horizontal position.

7. In combination, a vehicle frame, corner brackets thereon, a removable automobile body adapted to be positioned by said corner brackets, said body having doors hinged thereto adjacent one end thereof, a tail gate hinged to the frame and adapted when in upright position to prevent opening of said doors and when in lowered position to permit opening of said doors, means for locking the tail gate in upright position to the rear corner brackets, means for holding the tail gate in horizontal position when lowered, and means for locking the doors while in open position to the horizontal tail gate, whereby the carrying capacity of the automobile body is increased by the width of said doors.

8. In combination, a vehicle frame, a removable automobile body adapted to rest upon the frame, said body having a door therein, corner brackets on the frame having beveled side and end walls for positioning the body, and a cross bar hinged to the frame, said corner brackets having recesses therein into which the cross bar is adapted to be locked, and said cross bar having a portion thereof disposed when in locked position above the bottom of the door and functioning to hold the door in locked position.

In testimony whereof, I hereunto affix my signature.

BENJAMIN F. FITCH.